US008838470B2

(12) United States Patent
Kruglick (10) Patent No.: US 8,838,470 B2
(45) Date of Patent: Sep. 16, 2014

(54) DISPLAY MANAGEMENT (75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 94 days.

(21) Appl. No.: 13/143,282

(22) PCT Filed: Jun. 14, 2010

(86) PCT No.: PCT/US2010/038496
§ 371 (c)(1),
(2), (4) Date: Jul. 5, 2011

(87) PCT Pub. No.: WO2011/159273
PCT Pub. Date: Dec. 22, 2011

(65) Prior Publication Data
US 2012/0047023 A1    Feb. 23, 2012

(51) Int. Cl.
*G06Q 30/00* (2012.01)
*G06Q 30/02* (2012.01)
(52) U.S. Cl.
CPC ........ *G06Q 30/0241* (2013.01); *G06Q 30/0273* (2013.01); *G06Q 30/0283* (2013.01)
USPC .......................................................... 705/14
(58) Field of Classification Search
CPC combination set(s) only.
See application file for complete search history.

(56) References Cited

U.S. PATENT DOCUMENTS

| 6,839,068 | B2 | 1/2005 | Yoshioka |
| 7,652,678 | B2 | 1/2010 | Brunner et al. |
| 2002/0033837 | A1* | 3/2002 | Munro ........................ 345/654 |
| 2009/0278861 | A1* | 11/2009 | Price et al. .................... 345/668 |

FOREIGN PATENT DOCUMENTS

| JP | 2002-074030 A | 3/2002 |
| JP | 2002218340 | 8/2002 |
| JP | 2003509759 A | 3/2003 |
| JP | 2004-157585 | 6/2004 |
| JP | 2004264614 | 9/2004 |
| JP | 2005032104 | 2/2005 |
| JP | 2009294289 | 12/2009 |
| WO | 0119083 A1 | 3/2001 |

OTHER PUBLICATIONS

PCT International Search Report PCT/ISA/210 for PCT/US2010/38496 dated Apr. 25, 2011.

(Continued)

*Primary Examiner* — William A Brandenburg
*Assistant Examiner* — Christopher Busch
(74) *Attorney, Agent, or Firm* — Moritt Hock & Hamroff LLP; Steven S. Rubin, Esq.

(57) ABSTRACT

Technologies are generally described for managing display of data on a display. In some examples, the display includes a display area. In some examples, a method for managing display of data on the display includes receiving a first request from a first user, to display first data in the display area. In some examples, the method includes determining a first price for the first user, to display the first data in a first display sub-area in the display area and allocating in a memory the first data to the first display sub-area. In some examples, the method includes receiving a second request from a second user, to display second data in the display area. In some examples, the method includes determining a second price for the second user, to display the second data in a second display sub-area in the display area and allocating in the memory the second data to the second display sub-area.

14 Claims, 5 Drawing Sheets

(56) References Cited

OTHER PUBLICATIONS

PCT Written Opinion of the International Searching Authority PCT/ISA/237 for PCT/US2010/38496 dated Apr. 25, 2011.

Nicole Arksey, "Exploring the Design Space for Concurrent Use of Personal and Large Displays for In-Home Collaboration"; The University of British Columbia, (2007), 1-228.

* cited by examiner

DISPLAY MANAGEMENT

CROSS REFERENCE TO RELATED APPLICATIONS

This application is a 371 of International Application No. PCT/US2010/038496 filed Jun. 14, 2010, the entirety of which is hereby incorporated by reference.

BACKGROUND

Unless otherwise indicated herein, the materials described in this section are not prior art to the claims in this application and are not admitted to be prior art by inclusion in this section.

In a pervasive computing environment, a user may interface with many different computing systems. For example, a cell phone or a tablet PC may be adapted to interact with a GPS (global positioning system) network and provide information to a user based on the user's location. The provided information can change as the user moves to different locations.

SUMMARY

In an example, a method for managing display of data on a display is described. In some examples, the display includes a display area. In some examples, the method includes receiving a first request, by a processor, from a first user, to display first data in the display area. In some examples, the method includes determining, by the processor, a first price for the first user, to display the first data in a first display sub-area in the display area. In some examples, the method includes allocating in a memory, by the processor, the first data to the first display sub-area. In some examples, the method includes receiving a second request, by the processor, from a second user, to display second data in the display area. In some examples, the method includes determining, by the processor, a second price for the second user, to display the second data in a second display sub-area in the display area. In some examples, the method includes allocating in the memory, by the processor, the second data to the second display sub-area.

In an example, a system for managing display of data on a display is described. In some examples, the display includes a display area. In some examples, the system includes a memory and a processor in communication with the memory. In some examples, the processor is effective to receive a first request to display first data in the display area from a first user. In some examples, the processor is effective to determine a first price for the first user to display the first data in a first display sub-area in the display area. In some examples, the processor is effective to allocate in the memory the first data in the first display sub-area. In some examples, the processor is effective to receive a second request to display second data in the display area from a second user. In some examples, the processor is effective to determine a second price for the second user to display the second data in a second display sub-area in the display area. In some examples, the processor is effective to allocate in the memory the second data in the second display sub-area.

In an example, a system for managing display of data is described. In some examples, the system includes a processor. In some examples, the system includes a display in communication with the processor. In some examples, the display includes a display area. In some examples, the processor is effective to receive a first request to display first data in the display area. In some examples, the processor is effective to determine a first price for the first request to display the first data in a first display sub-area in the display area. In some examples, the processor is effective to receive the first data. In some examples, the processor is effective to send the first data to the display. In some examples, the processor is effective to receive a second request to display second data in the display area. In some examples, the processor is effective to determine a second price for the second request to display the second data in a second display sub-area in the display area. In some examples, the processor is effective to receive the second data. In some examples, the processor is effective to send the second data to the display. In some examples, the display is effective to receive the first and second data from the processor. In some examples, the display is effective to display the first data in the first display sub-area. In some examples, the display is effective to display the second data in the second display sub-area.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to display management.

Briefly stated, technologies are generally described for a method for managing display of data on a display. In some examples, the display includes a display area. In some examples, the method includes receiving a first request from a first user, to display first data in the display area. In some examples, the method includes determining a first price for the first user, to display the first data in a first display sub-area in the display area and allocating in a memory the first data to the first display sub-area. In some examples, the method includes receiving a second request from a second user, to display second data in the display area. In some examples, the method includes determining a second price for the second user, to display the second data in a second display sub-area in the display area and allocating in the memory the second data to the second display sub-area.

Figure 1:
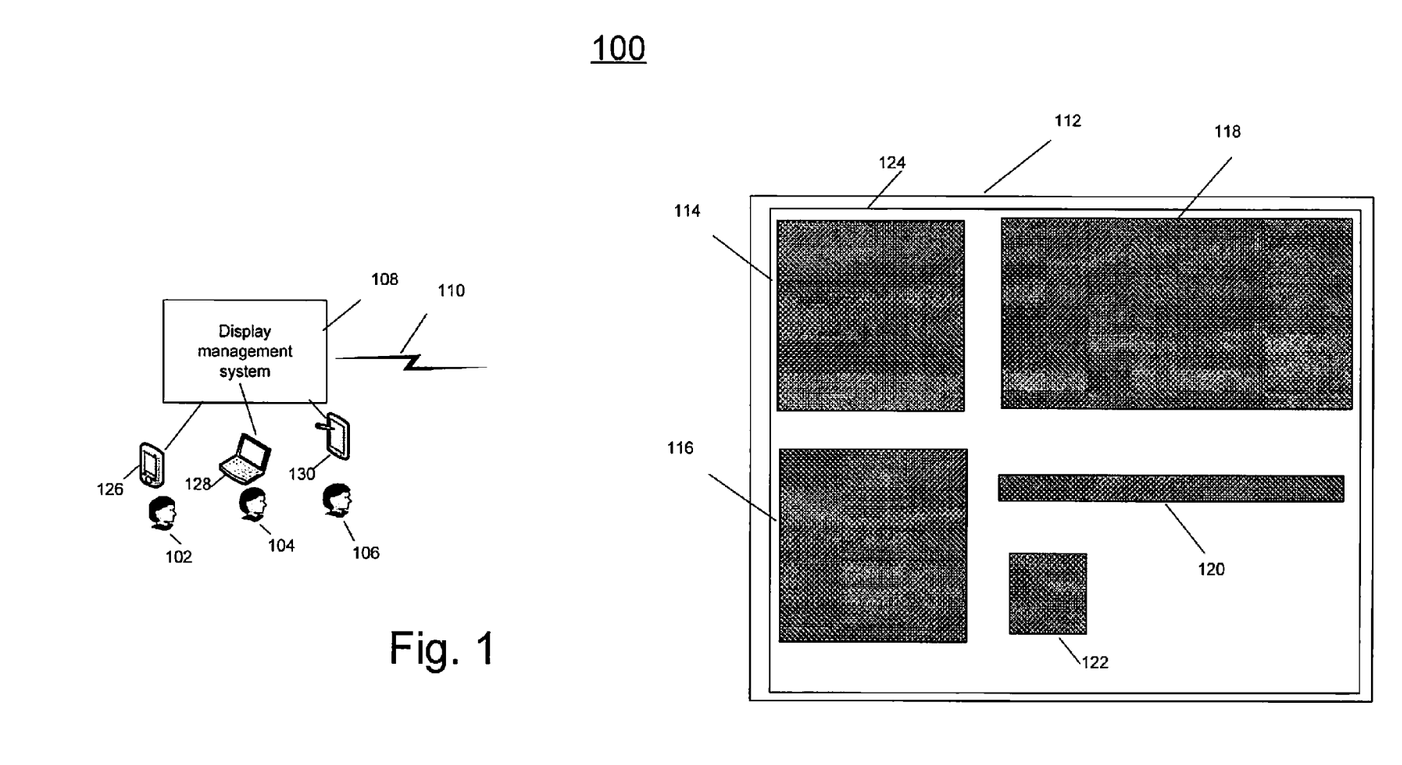
FIG. 1 illustrates some example systems that can be utilized to implement display management.

FIG. 1 illustrates some example systems that can be utilized to implement display management in accordance with at least some embodiments described herein. In some examples, a system 100 may include a display management system 108 in communication with users 102, 104, 106 through computing devices 126, 128, 130. Display management system 108 may further be in communication with a display 112 over a communication link 110. In some examples, display 112 may include a display area 124 and display sub-areas 114, 116, 118, 120, and/or 122. In some examples, display 112 may be a single screen, monitor, television, projection from a projector, etc.

As is explained in more detail below, in some examples, users 102, 104 and 106 may request that data be displayed in one or more of display sub-areas 114, 116, 118, 120 and/or 122 of display 112. Computing devices 126, 128, 130 may be configured to receive requests from users 102, 104 and 106 and send the requests to display management system 108. In some examples, the computing devices may be a cell phone 126, a laptop computer 128, and/or a tablet computer 130, etc. In some examples, display management system 108 may be configured to determine a price for user 102, 104, 106 to display data in a display sub-area. For example, a price to display data in a particular display sub-area may be based on a size of and/or a demand for the particular display sub-area as is discussed in more detail below.

Figure 2:
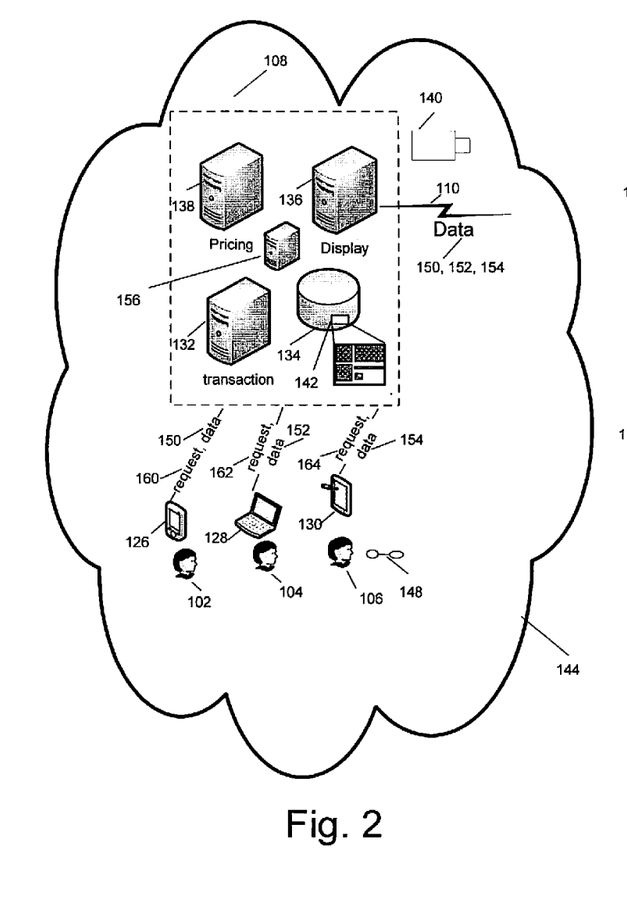
FIG. 2 illustrates some example systems that can be utilized to implement display management.

FIG. 2 illustrates some example systems that can be utilized for display management in accordance with at least some embodiments described herein. The system of FIG. 2 is substantially similar to system 100 of FIG. 1, with additional details. Those components in FIG. 2 that are labeled identically to components of FIG. 1 will not be described again for the purposes of clarity.

In addition to the components described above in FIG. 1, display management system 108 may further include a transaction engine 132, a display engine 136, a pricing and strategy engine 138, a controller 156, and/or a memory 134 all in communication through a network 144. In some examples, transaction engine 132, display engine 136, controller 156 and/or pricing engine 138 may be implemented by a single processor or housing and/or multiple processors or housings. In some examples, users 102, 104 and 106 may be in communication with display management system 108 through computing devices 126, 128, 130 over network 144. Network 144 could be any type of network including, for example, the Internet or a local area network. Computing devices 126, 128, 130 may be configured to send data 150, 152, 154 to display management system 108 in response to requests 160, 162, 164 by users 102, 104, 106. In some examples, data 150, 152, 154 could include text, audio, video, etc. In some examples, memory 134 may include a display management map 142. Display management map 142 may be adapted to define and indicate which display sub-areas 114, 116, 118, 120 and/or 122 have been allocated to display data. In some examples, communication link 110 may include, for example, a wireless communication link, a wired communication link, a projector or camera 140, etc.

In some examples, transaction engine 132 may be configured to receive one or more requests 160, 162, 164 from users 102, 104, 106 to display data in one or more of display sub-areas 114, 116, 118, 120 and/or 122. In some examples, pricing engine 138 may be configured to determine a price to display data in one or more of display sub-areas 114, 116, 118, 120 and/or 122 for requests 160, 162, 164.

In some examples, display engine 136 may be configured to send data 150, 152, 154 received from users 102, 104, 106 to communication link 110 to be displayed in display 112. In some examples, controller 156 may be configured to control display engine 136 to define and/or select one or more of display sub-areas 114, 116, 118, 120 and/or 122 to display data 150, 152, 154 based on information from display management map 142. For example, display engine 136 may be configured to maintain a size and location of display sub-areas 114, 116, 118, 120 and/or 122 in memory 134 based on information supplied by transaction engine 132. For example, transaction engine 132 may be configured to indicate how much space, size and/or an advertising plan a user purchased. For example, display management map 142 may be adapted to indicate which display sub-areas are allocated to display data 150, 152, 154 and to indicate which display sub-areas are available to display data. In some examples, display management map 142 may be adapted to indicate display sub-areas that are allocated to display data for users and which display sub-areas may be adjusted in size as discussed in more detail below.

In some examples, pricing engine 138 may be configured to determine a price to display data 150, 152, 154 in one or more of display sub-areas 114, 116, 118, 120 and/or 122 in a variety of different ways. For example, pricing engine 138 may be configured to determine a price to display data 150, 152, 154 based on a location of a requested display sub-area. For example, pricing engine 138 may be configured to determine a price to display data 150, 152, 154 based on a number or total area of display sub-areas allocated to display data for users 102, 104, 106. In some examples, the price may be greater if more display sub-areas are allocated to display data 150, 152, 154 from users 102, 104, 106. For example, if display sub-area 114 is allocated to display data 150 for user 102, a price to display data in display sub-area 118 may be greater than if display sub-areas 114 were not allocated to display data. Pricing engine 138 may be configured to use information in display management map 142 to determine an availability and price of display sub-areas.

In an example, pricing engine 138 may be configured to consult display management map 142 and determine that display sub-area 114 has been allocated for user 102. In this example, display sub-area 114 may not be available to display data to any other user at any price. In another example, pricing engine 138 may be configured to determine that display sub-area 114 may be available to a user 104 willing to pay more for display sub-area 114 than user 102.

In an example, pricing engine 138 may be configured to determine a first price for user 102 to display data 150 in display sub-area 114 when a first number of display sub-areas are allocated to display data. In an example, pricing engine 138 may be configured to determine a second higher price for user 102 to display data 150 in display sub-area 114 when a second greater number of display sub-areas are allocated to display data. In some examples, pricing engine 138 may be configured to receive data relating to pricing strategies over network 144. Pricing strategies may change based on time of day or based on other scheduling factors.

In an example, pricing engine 138 may be configured to determine a first price for user 102 to display data 150 on display sub-area 118 of a first size when a first number of display sub-areas are allocated to display data. In the example, controller 156 may be configured to change a size of display sub-area 118 to a smaller size when a second greater number of display sub-areas are allocated to display data for users 102, 104, 106. In an example, when user 102 makes request 160 to display data 150 in display sub-area 118, transaction engine 132 and/or controller 156 may be configured to indicate that display sub-area 118 has a flexible size by updating display management map 142.

In examples where transaction engine 132 subsequently receives a second request 162 from user 104 to display data 152, transaction engine 132 and/or controller 156 may be configured to analyze display management map 142. In an example, transaction engine 132 and/or controller 156 may be configured to allocate one of the display sub-areas, which in some examples may include defining a display sub-area, to display data 152 for user 104. In an example, controller 156 and/or display engine 136 may be configured to reduce a size of display sub-area 118, as shown by line 158, so that two or more display sub-areas 118a, 118b are generated. In the example, controller 156 and/or display engine 136 may be configured to update an allocation of data in display management map 142 in response to the second request. In the example, controller 156 and/or display engine 136 may be configured to display data 150 for user 102 in display sub-area 118a, and display data 152 for user 104 in display sub-area 118b. In an example, pricing engine 138 may be configured to provide a second higher price for user 102 to display data 150 in display sub-area 118 of a fixed size regardless of subsequent demand or requests 160, 162, 164.

In an example, pricing engine 138 may be configured to generate a first price for user 102 to display data 150 on a part of display sub-area 116. In the example, controller 156 and/or display engine 136 may be configured to display advertisements in another part 146 of display sub-area 116. In the example, pricing engine 138 may be configured to generate a second higher price for user 102 to display data in all of display sub-area 116 without advertisements.

In some examples, pricing engine 138 may be configured to generate prices to display data in display sub-areas based on a size of the display sub-area, demand for display sub-areas, a time of day, pricing messages received over a network, memberships, affiliations, classes (e.g. a first class ticket may receive preferential pricing) identity of a user, etc. In some examples, pricing engine 138 may be configured to generate prices to display data in display sub-areas based on bids and requests 160, 162, 164 from users 102, 104, 106.

In some examples, controller 156 and/or display engine 136 may be configured to receive data 150, 152, 154 from computing devices 126, 128, 130 and send data 150, 152, 154 to display 112. In some examples, controller 156 and/or display engine 136 may be configured to generate one or more display sub-areas 114, 116, 118, 120, 122 in display management map 142 and in display area 124. For example, controller 156 and/or display engine 137 may be configured to send different sets of data to different display sub-areas of display 112 using XML (extensible markup language).

In some examples, controller 156 and/or display engine 136 may be configured to send data 150, 152, 154 to display 112 so that all users 102, 104, 106 may be able to view data 150, 152, 154. In some examples, controller 156 and/or display engine 136 may be configured to hide data 150 so that data 150 is displayed in display area 124 in a hidden format. For example, controller 156 and/or display engine 136 may be configured to send data 154 to display 112 with alternating frames of additional data In the example, user 106 may be provided with shutter glasses 148 that may be configured to allow viewing of data 154 for user 106. Shutter glasses 148 may be configured to open and close in synch with hidden data 154 so that user 106 may be able to see data 154 and not the additional data. In this example, other users 102, 104 may only see an average of data and additional data in data 154 which may result in a gray screen.

Among other benefits, sizes and prices of display sub-areas may be modified based on demand and current allocations for display sub-areas. Available display space can be sold and managed and an appropriate cost determined. Prices can be generated that change based on demand, location in a display, display of advertisements, whether the size of the display sub-area can change if demand changes, etc. Users can use a portion of a single large display which may be less expensive than users each outputting data to their own respective display.

Figure 3:
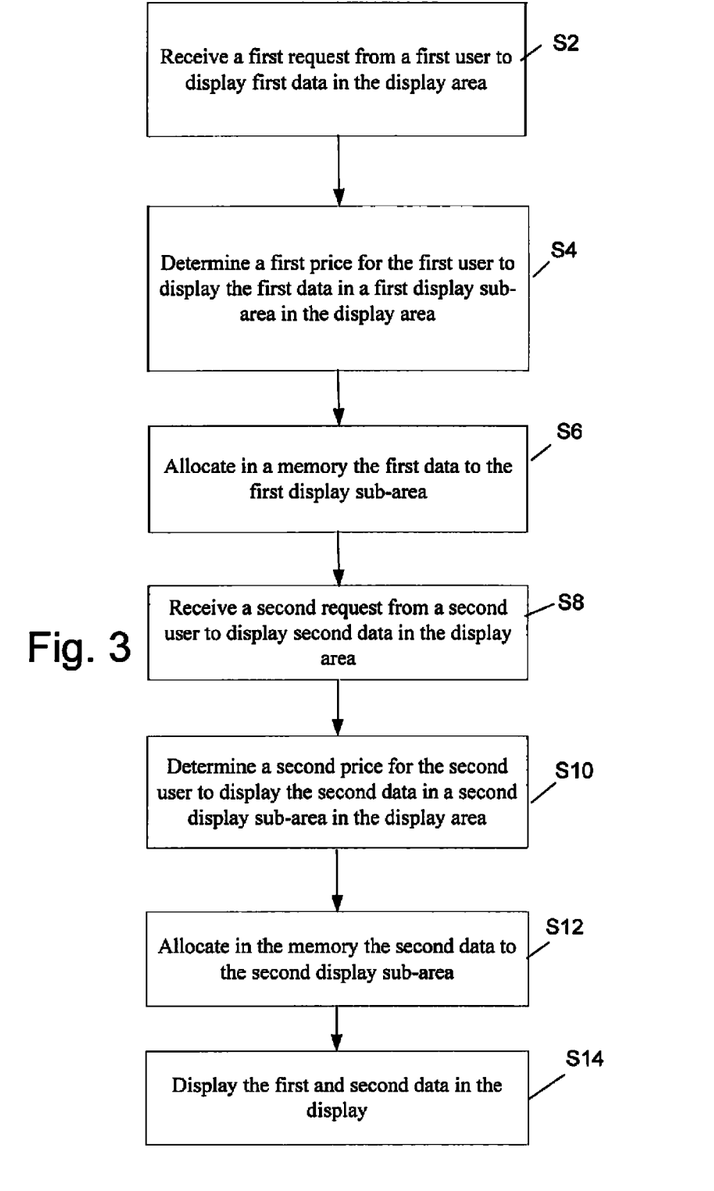
FIG. 3 depicts a flow diagram for example processes for implementing display management.

FIG. 3 depicts a flow diagram for example processes for implementing display management in accordance with at least some embodiments described herein. The process in FIG. 3 could be implemented using, for example, system 100 discussed above. An example process may include one or more operations, actions, or functions as illustrated by one or more of blocks S2, S4, S6, S8, S10, S12 and/or S14. Although illustrated as discrete blocks, various blocks may be divided into additional blocks, combined into fewer blocks, or eliminated, depending on the desired implementation. Processing may begin at block S2.

At block S2, a display management system may be configured to receive a first request from a first user to display first data in a display area. The display area may include display sub-areas. Processing may continue from block S2 to block S4.

At block S4, the display management system may be configured to determine a first price for the first user to display the first data in a first display sub-area in the display area. Processing may continue from block S4 to block S6.

At block S6, the display management system may be configured to allocate in a memory the first data to the first display sub-area. Processing may continue from block S6 to block S8.

At block S8, the display management system may be configured to receive a second request from a second user to display second data in the display area. Processing may continue from block S8 to block S10.

At block S10, the display management system may be configured to determine a second price for the second user to display the second data in a second display sub-area in the display area. Processing may continue from block S10 to block S12.

At block S12, the display management system may be configured to allocate in the memory the second data to the second display sub-area. Processing may continue from block S12 to block S14.

At block S14, the display management system may be configured to display the first and second data in the display.

Figure 4:
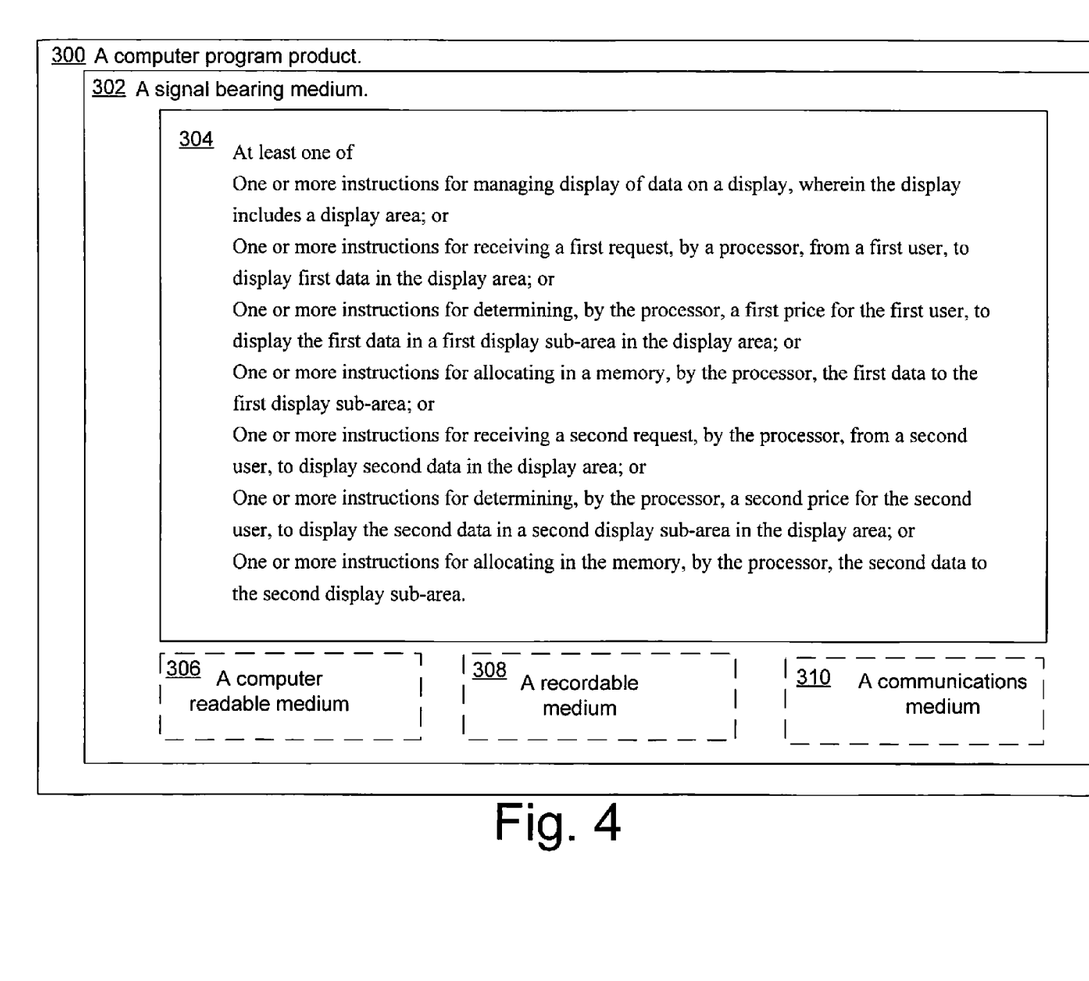
FIG. 4 illustrates computer program products for implementing display management.

FIG. 4 illustrates computer program products 300 implementing display management arranged according to at least some embodiments described herein. Program product 300 may include a signal bearing medium 302. Signal bearing medium 302 may include one or more instructions 304 that, when executed by, for example, a processor, may provide the functionality described above with respect to FIGS. 1-3. Thus, for example, referring to system 100, one or more of processors in display management system 108 may undertake one or more of the blocks shown in FIG. 4 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with an IEEE 802.11 standard).

Figure 5:
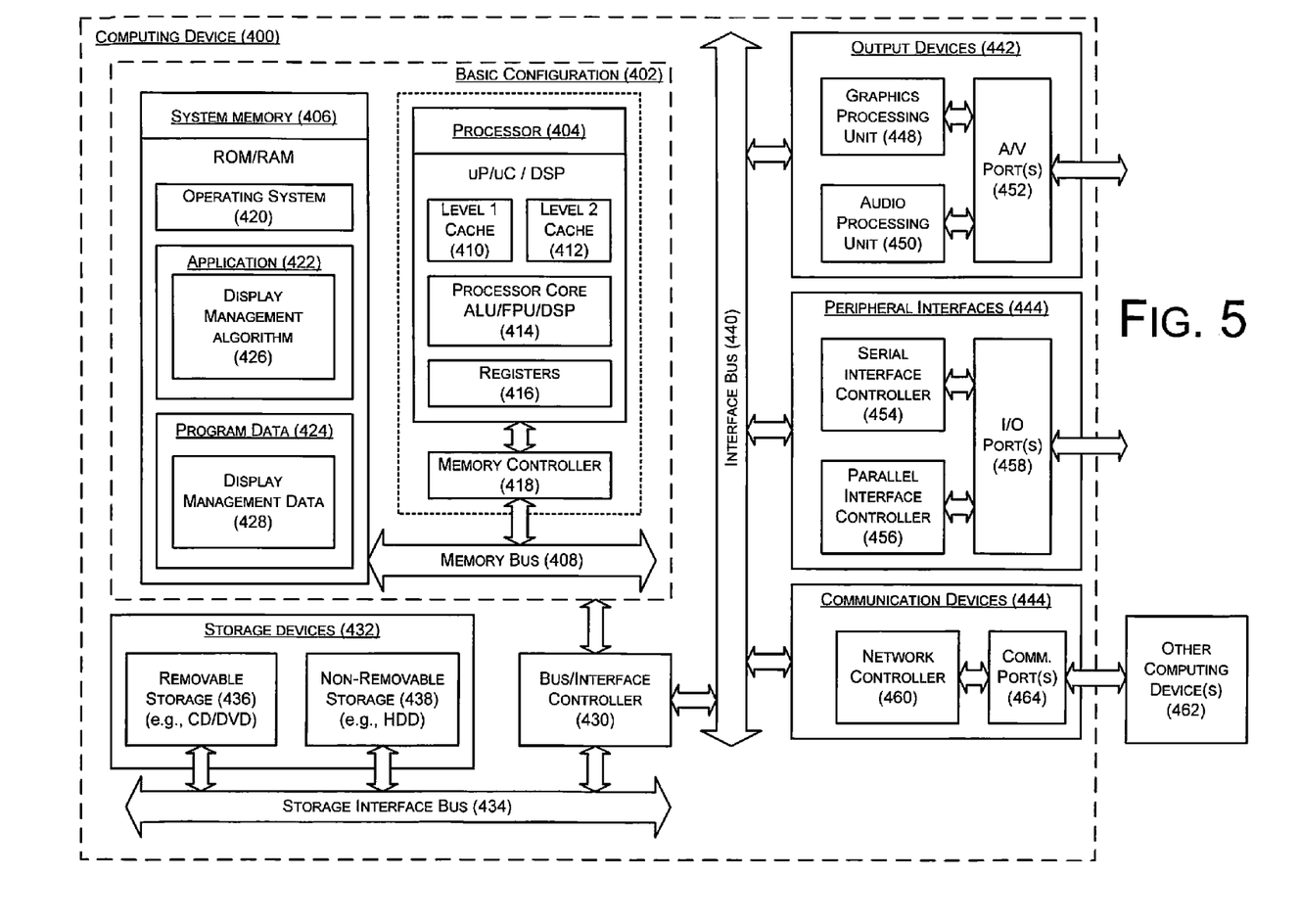
FIG. 5 is a block diagram illustrating an example computing device that is arranged to perform display management; all arranged according to at least some embodiments described herein.

FIG. 5 is a block diagram illustrating an example computing device 400 that is arranged to implement display management according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a display management algorithm 426 that is arranged to perform the functions as described herein including those described previously with respect to FIGS. 1-4. Program data 424 may include display management data 428 that may be useful for implementing display management as is described herein. In some embodiments, application 422 may be arranged to operate with program data 424 on operating system 420 such that display management may be provided. This described basic configuration 402 is illustrated in FIG. 5 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for managing display of data on a display, wherein the display includes a display area effective to display data to at least a first user and a second user, the method comprising:
    receiving a first request, by a processor, from the first user, to display first data in the display area of the display;
    determining, by the processor, a first price for the first user, to display the first data in a first display sub-area in the display area, the first price being based on a first size and a first location of the first display sub-area;
    allocating in a memory, by the processor, the first data to the first display sub-area;
    receiving a second request, by the processor, from the second user, to display second data in the display area of the display;
    determining, by the processor, a second price for the second user, to display the second data in a second display sub-area in the display area, the second price being based on a second size and a second location of the second display sub-area;
    changing, by the processor, the first price, the first size, and the first location of the first display sub-area in response to the second request; and
    allocating in the memory, by the processor, the second data to the second display sub-area.

2. The method of claim 1, further comprising determining the first price based on a number or total area of display sub-areas allocated in the memory.

3. The method of claim 1, further comprising:
receiving a third request, by the processor, for a third user, to display third data in the first display sub-area;
determining, by the processor, a third price for the third user to display the third data in the first display sub-area based on the first price; and
allocating in the memory, by the processor, the third data to the first display sub-area.

4. The method of claim 1, wherein the first display sub-area is further divided into a first area and a second area, the method further comprising:
receiving a third request, by the processor, from a third user, to display third data in the display area;
changing the first size of the first display sub-area, by the processor in response to the third request to display the third data in the display area;
allocating in the memory, by the processor, the first data in the first area; and
allocating in the memory, by the processor, the third data to the second area.

5. The method of claim 1, further comprising:
displaying the first data in the first display sub-area; and
displaying the second data in the second display sub-area.

6. The method of claim 1, further comprising determining the first price based on whether the first size of the first display sub-area can be changed by the processor.

7. The method of claim 1, further comprising allocating in the memory, by the processor, an advertisement in a part of the first display sub-area.

8. The method of claim 1, further comprising hiding the first data by the processor.

9. A system for managing display of data on a display, wherein the display included a display area effective to display data to at least a first user and a second user, the system comprising:
a memory; and
a processor in communication with the memory, wherein the processor is effective to:
receive a first request from the first user, to display first data in the display area of the display;
determine a first price for the first user, to display the first data in a first display sub-area in the display area, the first price being based on a first size and a first location of the first display sub-area;
allocate in a memory, the first data to the first display sub-area;
receive a second request to display second data in the display area of the display;
determine a second price for the second user, to display the second data in a second display sub-area in the display area, the second price being based on a second size and a second location of the second display sub-area;
change the first price, the first size, and the first location of the first display sub-area in response to the second request; and
allocate in the memory, the second data to the second display sub-area.

10. The system as recited in claim 9, wherein the processor is effective to determine the first price based on a number or total area of display sub-areas allocated in the memory.

11. The system as recited in claim 9, wherein:
the first display sub-area is further divided into a first area and a second area, and the processor is further effective to:
receive a third request to display third data in the display area from a third user;
change the first size of the first display sub-area in response to the third request to display the third data in the display area;
allocate in the memory the first data to the first area; and
allocate in the memory the third data to second area.

12. The system as recited in claim 9, wherein the processor is further effective to hide the first data.

13. A system effective to manage display of data, the system comprising:
a processor; and
a display in communication with the processor, wherein the display includes a display area; and wherein the processor is effective to:
receive a first request to display first data in the display area of the display;
determine a first price for the first request to display the first data in a first display sub-area in the display area, the first price being based on the first display sub-area;
receive the first data;
send the first data to the display;
receive a second request to display second data in the display area of the display;
determine a second price for the second request to display the second data in a second display sub-area in the display area, the second price being based on the second display sub-area;
change the first price, a size, and a location of the first display sub-area in response to the second request;
receive the second data; and
send the second data to the display; and wherein the display is effective to:
receive the first and second data from the processor; display the first data in the first display sub-area; and
display the second data in the second display sub-area.

14. The system as recited in claim 13, wherein the processor is effective to send the first and second data to the display through a projector.

\* \* \* \* \*

UNITED STATES PATENT AND TRADEMARK OFFICE
CERTIFICATE OF CORRECTION

PATENT NO.       : 8,838,470 B2
APPLICATION NO.  : 13/143282
DATED            : September 16, 2014
INVENTOR(S)      : Kruglick

Page 1 of 1

It is certified that error appears in the above-identified patent and that said Letters Patent is hereby corrected as shown below:

In the Claims

In Column 11, Line 39, in Claim 9, delete "from the first user, to display" and insert -- to display --, therefor.

Signed and Sealed this
Thirty-first Day of March, 2015

Michelle K. Lee
*Director of the United States Patent and Trademark Office*